(12) United States Patent
Bloechl

(10) Patent No.: US 10,887,860 B1
(45) Date of Patent: Jan. 5, 2021

(54) APPARATUS AND METHOD FOR OPTIMIZING WIRELESS END NODE LOCATION DETERMINATION VIA TARGETED PROXIMITY RANGING TO CLUSTERS OF OTHER WIRELESS NODES

(71) Applicant: Link Labs, Inc., Annapolis, MD (US)

(72) Inventor: Mark O. Bloechl, Elkridge, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 16/911,840

(22) Filed: Jun. 25, 2020

(51) Int. Cl.
*H04W 64/00* (2009.01)
*H04W 48/12* (2009.01)

(52) U.S. Cl.
CPC .......... *H04W 64/00* (2013.01); *H04W 48/12* (2013.01)

(58) Field of Classification Search
CPC ..... H04W 64/00; H04W 48/12; H04W 84/18; H04W 4/029; H04W 88/08; H04W 84/12; H04W 4/021; H04W 4/023; H04W 64/003; H04W 52/0209; H04W 72/12; H04W 4/026; H04W 4/33; H04W 52/0206; H04B 17/318; H04B 7/0413; H04B 7/0617; H04B 7/024; H04B 1/06; H04B 7/026; H04B 17/21; H04B 17/27; H04B 17/336; H04B 17/373; H04B 1/3833; H04B 1/401; H04B 1/74; H04B 7/0408; H04B 7/0452; H04B 7/0632; H04L 41/12; H04L 63/302; H04L 5/0007; H04L 67/22; H04J 3/1694; H04J 13/0062; H04J 1/05; H04J 11/0023; H04J 11/0053; H04J 11/0069; H04J 1/045; H04M 1/7253; H04M 1/72569; H04M 2250/12; H04M 1/72522
See application file for complete search history.

(56) References Cited

U.S. PATENT DOCUMENTS

| | | | |
|---|---|---|---|
| 9,063,212 B2 * | 6/2015 | Jones, Jr. | .................. G01S 1/68 |
| 2005/0164710 A1 * | 7/2005 | Beuck | ................... G01S 5/0027 |
| | | | 455/456.1 |
| 2008/0176583 A1 * | 7/2008 | Brachet | ................. H04W 8/005 |
| | | | 455/456.3 |
| 2011/0195699 A1 * | 8/2011 | Tadayon | ................. H04M 3/53 |
| | | | 455/418 |
| 2011/0294516 A1 * | 12/2011 | Marshall | ............... G01S 5/0252 |
| | | | 455/456.1 |
| 2013/0028177 A1 * | 1/2013 | Koskela | .................. H04W 4/70 |
| | | | 370/328 |
| 2015/0085830 A1 * | 3/2015 | Nozaki | ................. H04W 40/00 |
| | | | 370/332 |
| 2020/0034501 A1 * | 1/2020 | Duff | .................... G02B 27/0172 |
| 2020/0228924 A1 * | 7/2020 | Lelkens | ................ G01S 5/0284 |

* cited by examiner

*Primary Examiner* — Nimesh Patel
(74) *Attorney, Agent, or Firm* — Charles B. Lobsenz; Brian H. Buck; Potomac Law Group, PLLC

(57) ABSTRACT

Provided are a wireless communications node (WCN) and a method therefor achieving optimized estimation of coordinate location of the WCN relative to wireless communications with a plurality of reference points (RPs). To do so, the WCN coordinates clustering of such RPs, and determines an estimated coordinate location of the WCN based on one or more RPs of selected ones of clusters each having a centroid thereof that is measured as being most proximate the WCN when compared with unselected clusters.

26 Claims, 17 Drawing Sheets

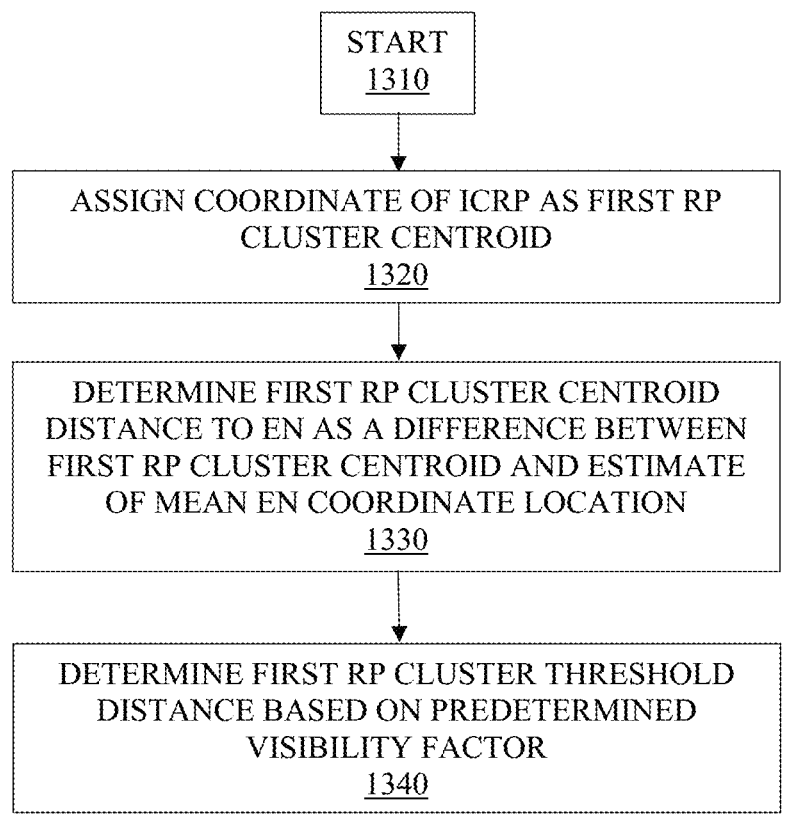

```
        START
         1310
           │
           ▼
┌─────────────────────────────────┐
│ ASSIGN COORDINATE OF ICRP AS    │
│ FIRST RP CLUSTER CENTROID       │
│             1320                │
└─────────────────────────────────┘
           │
           ▼
┌─────────────────────────────────┐
│ DETERMINE FIRST RP CLUSTER      │
│ CENTROID DISTANCE TO EN AS A    │
│ DIFFERENCE BETWEEN FIRST RP     │
│ CLUSTER CENTROID AND ESTIMATE   │
│ OF MEAN EN COORDINATE LOCATION  │
│             1330                │
└─────────────────────────────────┘
           │
           ▼
┌─────────────────────────────────┐
│ DETERMINE FIRST RP CLUSTER      │
│ THRESHOLD DISTANCE BASED ON     │
│ PREDETERMINED VISIBILITY FACTOR │
│             1340                │
└─────────────────────────────────┘
```

FIG. 13A

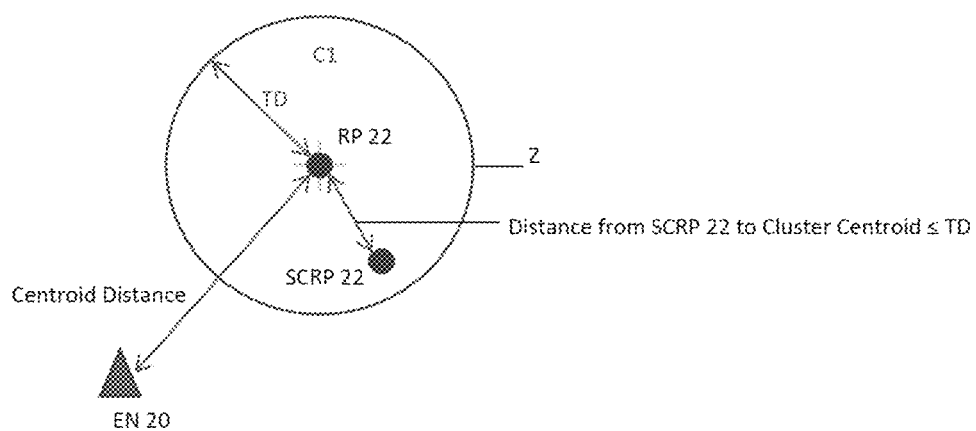

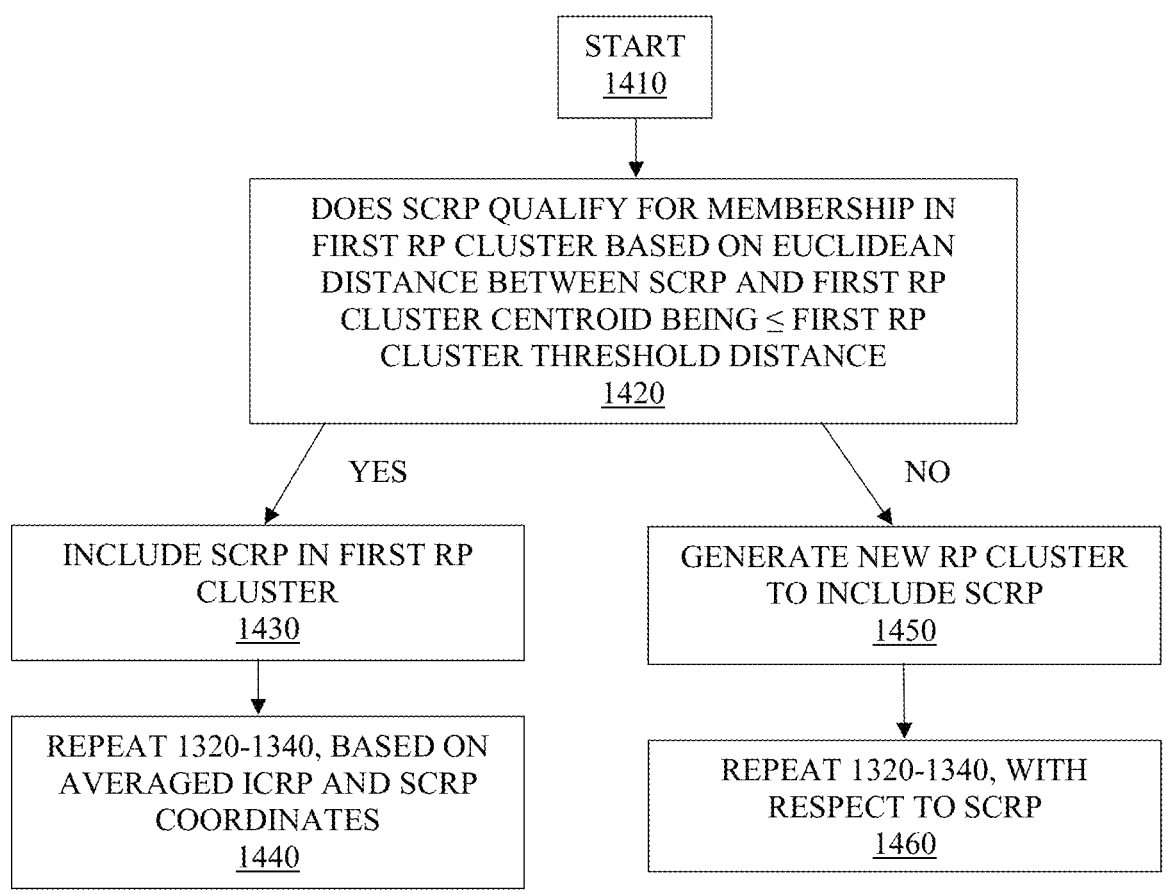

As to 1130

As to 1140

As to 1150

APPARATUS AND METHOD FOR OPTIMIZING WIRELESS END NODE LOCATION DETERMINATION VIA TARGETED PROXIMITY RANGING TO CLUSTERS OF OTHER WIRELESS NODES

FIELD OF THE DISCLOSURE

Disclosed embodiments relate to wireless communications, and more specifically, to narrowing an estimation of a location of one or more wireless nodes based on targeted or selective ranging to clusters of other wireless nodes.

BACKGROUND

As wireless communications increasingly support applications within and for the Internet of Things ("IoT"), the reliability of devices that implement those communications and provide the information to be drawn therefrom has become a continuing focus of optimization.

Such focus exists for many reasons, including, but not limited to, achievable device miniaturization, diversity, processing capacity, energy efficiency, and adaptability of/for use in a particular task. Whether a particular device may be effective in carrying out such a particular task is often a function of whether it is equipped to accommodate, i.e., overcome, commonly encountered impingements on the efficacy of its wireless communication ability.

One such impingement to be addressed is that of multipath during the course of radio frequency (RF) signal exchange between wireless devices, irrespective of the protocol governing such exchange. Put simply, multipath may be understood as the wave propagation of an RF signal that reaches its destination by a direct path and an indirect path. The indirect path may be caused by reflection resulting from, for instance, physical structure interposed between the source of the signal and the destination. As a result of such directional variance in the travel paths of constituent waves, one or more portions thereof may arrive at their destination out of phase with each other due to multipath interference.

Due to this interference, data carried or embodied by the signal may be corrupted, and thus reliance on that data may be impaired.

Depending on the task at hand, such corruption may entirely impede any ability to execute the task.

In the IoT context, wireless devices may often be used to discern a tracked or trackable location of an item, person or other object, whereby knowledge of such location is inherently valuable and such value is monetarily or otherwise derived. To discern the aforementioned location, the location of an associated end node may be communicated to an intended recipient, based on a relative location of one or more reference points or nodes.

When determining the location of the associated end node, however, factors such as the capacity to communicate with a finite number of reference points and the spatial arrangement of those reference points must be considered.

For instance, and with respect to capacity, interactions between the associated end node and one or more reference points may be time consuming, such that location determination with respect to any one given reference point may preclude an ability to carry out desirable communication with another of such reference points. Further, and with respect to spatial arrangement, co-location of reference points may skew attempted location determination by the associated end node. Any addition and reduction of reference points may respectively lead to additional skewing of location and reduction in ranging capacity by the associated end node.

Thus, it would be desirable to maximize the accuracy with which the associated end node may determine its location even when multipath interference may or may not be present among one or more co-located reference points, and to do so with increased efficiency in the calculation of that determination.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An embodiment may include a wireless communications node (WCN) configured to, within a given space, receive reference point (RP) coordinates included in beacon advertisement messages transmitted from a plurality of RPs, in which the WCN includes one or more processors configured to execute a set of instructions including determining an estimated coordinate location of the WCN based on the coordinates of each of the plurality, arranging one or more of plurality into a first cluster and at least another cluster thereof, determining whether the first cluster or the at least another cluster is most proximate to the estimated coordinate location of the WCN, determining an estimated true range of the WCN to one or more of the RPs included in the cluster determined to be most proximate to the estimated coordinate location of the WCN, and based on the one or more estimated true ranges, determining a coordinate location of the WCN.

Another embodiment may include a method of locating a wireless communications node (WCN) within a given space, including receiving, at the WCN, reference point (RP) coordinates included in beacon advertisement messages transmitted from a plurality of RPs, determining, at the WCN, an estimated coordinate location of the WCN based on the coordinates of each of the plurality, arranging, at the WCN, one or more of plurality into a first cluster and at least another cluster thereof, determining, at the WCN, whether the first cluster or the at least another cluster is most proximate to the estimated coordinate location of the WCN, determining, at the WCN, an estimated true range of the WCN to one or more of the RPs included in the cluster determined to be most proximate to the estimated coordinate location of the WCN, and based on the one or more estimated true ranges, determining, at the WCN, a coordinate location of the WCN.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIG. 13 is a sequence diagram setting forth a manner of determining a first RP cluster of the listing of RP clusters in FIG. 12;

FIG. 13A illustrates a manner of determining a composition of the first RP cluster of FIG. 12;

FIG. 14 is a sequence diagram setting forth a manner of determining a subsequent RP cluster other than the first RP cluster of FIG. 13;

DETAILED DESCRIPTION

Figure 1:
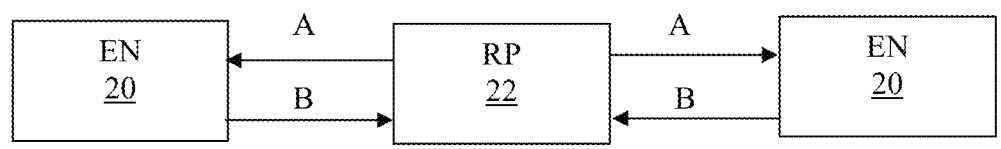
FIG. 1 is an illustration of wireless communications between a reference point (RP) and an end node (EN), in which the RP transmits a beacon advertisement message to be detected by the EN.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Herein, the term "range" is used to mean "separable" or "separated" distance. Referring to FIG. 1 and in the context of radio frequency (RF) communications between wireless communications nodes, RF signals may be transmitted between such nodes on various channels within and across a given frequency band. The communications may occur according to applicable protocol including, but not limited to, BLUETOOTH LOW ENERGY (BLE). When executing those communications, and with reference to FIG. 1, first or mobile wireless connection end node (EN) 20 may acknowledge, according to arrows "B" one or more beacon advertisement messages transmitted according to arrows "A" from, for example, a stationary reference point (RP) 22 and setting forth parameters for the communications between an EN 20 and the RP 22. The beacon advertisement message provides information enabling the initiation and establishment of wireless communications among the EN 20 and, for example, the RP 22. The RP 22 may or may not be connectable to a network, such as that shown in FIG. 3.

As will be understood, each of EN 20 and RP 22, in conjunction with their constructions as detailed herein, may be configured with all appropriate software and/or hardware, including one or more processors and storage which may be necessary for implementing their respective wireless communications, including their transmission, receipt and processing of information to determine parameters, constructions and quantities as discussed herein.

Figure 2:
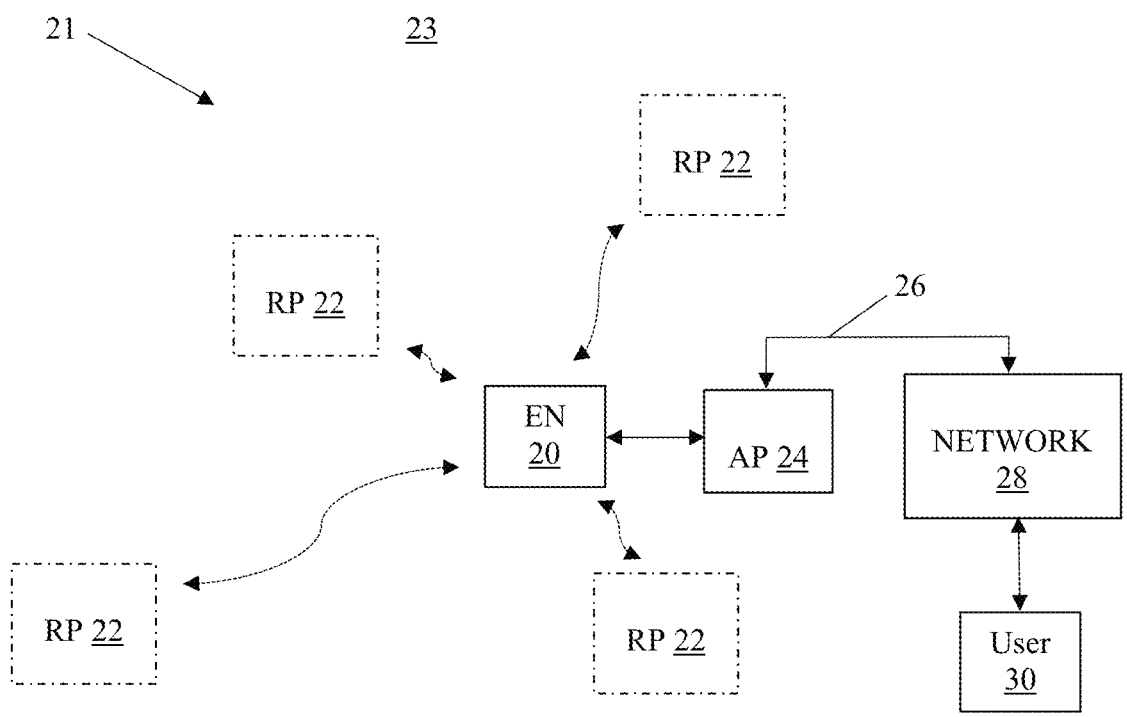
FIG. 2 is an illustration of an exemplary system of wireless communications among an EN and RPs of FIG. 2, in which the EN is connectable to an access point (AP) for the transfer of information associated with the EN to a network and then to an end user.

Throughout such communications, and the constituent transfer of RF signals between the EN 20 and RP 22, according to FIG. 2, for example, at least one of the EN 20 and RP 22 may cause the transfer to occur according to a frequency hopping regime or map to avoid multipath interference. While such interference may not be able to be entirely eliminated, embodiments herein contemplate mitigating such interference by causing the hopping to occur among, for example, channels that are less congested than others due to decreased interference. To do so, the EN 20 or RP 22 from which the beacon advertisement originated may employ a frequency hopping map enabling the hopping to occur on duplicates of the otherwise congested channel. Congestion may be confirmed as the EN 20 compares, relative to a predetermined threshold, IQ or quadrature samples of signaling between the EN 20 and the RP 22, and wherein I represents the amplitude an in-phase carrier, and Q represents the amplitude of a quadrature phase carrier. Should the congestion due to multipath interference still remain, such a congested channel may be discarded, and an alternative frequency hopping map may be implemented in which a value for the hop across the still congested channel is interpolated from among adjacent channels. Whether there exists a need for the aforementioned duplicate substitution and/or interpolation depends on the EN 20 conducting a measurement of a change in phase between sampling of the EN's signal as performed by and returned to the EN 20 by the RP 22 and sampling of the RP's return signal by the EN 20. Resulting from the aforementioned duplication and/or interpolation is a phase measurement which may be derived as the product of the returned EN 20 sampling, as performed by the RP 22, and the RP 22 sampling conducted by the EN 20. Such a product may thus be regarded as a measurement of phase that is substantially free of frequency and phase offset, and thereafter used to determine a physical range or distance between the EN 20 and the RP 22. See U.S. Patent Application Publication No. 2020/0113006 A1, which is assigned to the assignee of the present application and incorporated herein by reference in its entirety, for a more complete discussion of IQ sampling, albeit with respect to the appendage of Constant Tone Extension (CTE).

Referring to FIG. 2, there is illustrated an exemplary system 21 for wireless communications. The system may include the EN 20 and optionally one RP 22 or a plurality thereof, including, but not limited to, four RPs 22, as shown. As discussed hereinbelow, the EN 20 may be configured to determine its range to one or more of the RPs 22, and based on that range, its coordinate location within a space 23 in which the EN 20 is operable. That is, the EN 20 may be configured to determine its location as the EN 20 moves throughout the space 23 and among each of the RPs 22 which are fixed to a given location. To do so, the EN 20 may be configured to derive such coordinate location based on each of coordinate locations respectively transmitted from a given RP 22 to the EN 20. Once determined, such coordinate location and contained information including sensory information, access information, notification information, alarm information, and any other status and/or content information thereof as may be applicable to its particular configuration may be transferred through an access point (AP) 24 and its backhaul 26, implemented by a cellular, WiFi, Low Power Wide Area Network (LPWAN) configuration, to a network or cloud service 28 for transfer to an end user terminal 30, such as a personal computing or other electronic device enabled to convey the aforementioned information. For instance, it is contemplated that EN 20 may be physically attached to and associated with an object for the transfer of any of the aforementioned types of information so as to be applicable to such environments including a workplace or other type of commercial environment in which commerce is a purpose, a residence, and a medical facility or other facility in which tracking of persons or objects is necessary and/or desired.

When engaging in the aforementioned communications, the EN 20 and a respective RP 22 may undertake to conduct sampling of those communications to derive a time of flight (ToF) measurement of the transmitted EN 20 RF signal and to measure any change in phase with respect to such signaling as between the EN 20 and the RP 22. To do so, the signaling may be sampled by each of the EN 20 and RP 22 in IQ format.

It will be understood that each of the EN 20 and RP 22 may be equipped with all of the necessary storage, hardware and/or software necessary for executing the aforementioned wireless communications, as well as the IQ sampling in connection therewith.

An EN 20 (or Node A as referred to in the equations below) may perform a scan within space 23 to detect those RPs 22 (or Nodes B as referred to in the equations below) for which signaling is receivable. Upon detection, the EN 20 may initiate a connection with the first detected RP 22, and transmit signaling in response to the beacon advertisement message received from the RP 22. In particular, one or more portions of the response signal, as transmitted, may be described by the following:

$e^{j(\omega_A t + \phi_A)}$, in which e is Euler's number,
j is the square root of −1,
$\omega_A$ is the angular frequency of EN 20's signal, and
$\varphi_A$ is an arbitrary phase shift of EN 20's signal.

The response may then be received by the RP 22 as the following:

$e^{j(\omega_A t + \phi_A + \phi_{AB}(f,r))}$, in which $\phi_{AB}(f,r)$ is the phase shift introduced during propagation, given as a function of frequency (f) and range (r) by $\phi(f,r) = -2\pi f r/c$, where c is the speed of light.

Once the EN's response is received at the RP 22, the RP 22 may conduct its own IQ sampling of the response as transmitted by the EN 20, and store the same. Thereafter, the RP 22 transmits that stored IQ sampling back to the EN 20 in the form of a data packet. With respect to a signal transmission, the EN 20 may correct for phase and frequency offsets, according to:

$e^{j((\omega_A - \omega_B)t + \phi_A - \phi_B + \phi_{AB})} e^{j(-(\omega_A - \omega_B)t - \phi_A + \phi_B + \phi_{AB})} = e^{j2\phi_{AB}(f,r)}$
$= Z(f,r)$, in which Z represents the signal after being converted to complex baseband.

As a result, the EN 20 effectively receives both the RP's signal and the RP's IQ sampling of the EN's response, which is contained within that signal. Similar to the RP 22, the EN 20 conducts IQ sampling of the RP 20 signal, and decodes the data packet therein to obtain the RP's sampling of its own response signal which had been initially transmitted to the RP 22. That is, the EN 20 is now in possession of two sets of IQ sampling, including sampling of its response signal, as performed by the RP 22, as well as sampling of the RP 20 signal, as performed by the EN 20 on the RP's signal containing the RP's sampling of the EN's response signal.

Both sets of discrete IQ sampling may be stored by the EN 20 according to a same channel within the wireless band and a calculated ending phase of the RP signal. The ending phase may be calculated by the EN 20 according to the RP 22 transmitted data and based on a formula empirically determined from phase measurements of the chipset generating the transmitted signal. Said alternatively, the exchange, i.e., the transmission and receipt of data packets between the EN 20 and the RP 22, occurs without deviation among channels of the wireless band.

Once having accumulated the IQ samples across the wireless band, the EN 20 sorts those samplings into channel, or frequency, order.

Samples from each phase are then averaged over a configurable window. The corresponding samples from each phase are then multiplied together, for each channel. That is, averaged samples belonging to the EN 20 are multiplied by averaged samples belonging to the RP 22, for each channel. The resultant yield is a phase measurement sample, for example, Z(n) as referenced above, that is substantially free of phase and frequency offset for each channel.

A window according to, for example, Hanning or Blackman-Harris, may then be applied to the samples, which may then be zero padded to reach a power of two (2), nominally 128. Thereafter, an Inverse Fast Fourier Transform (IFFT) may be performed. A peak value (p), in the absence of multipath propagation, or when low multipath propagation may be experienced, may then be selected for use in determining the distance to the RP 22.

Figure 3:
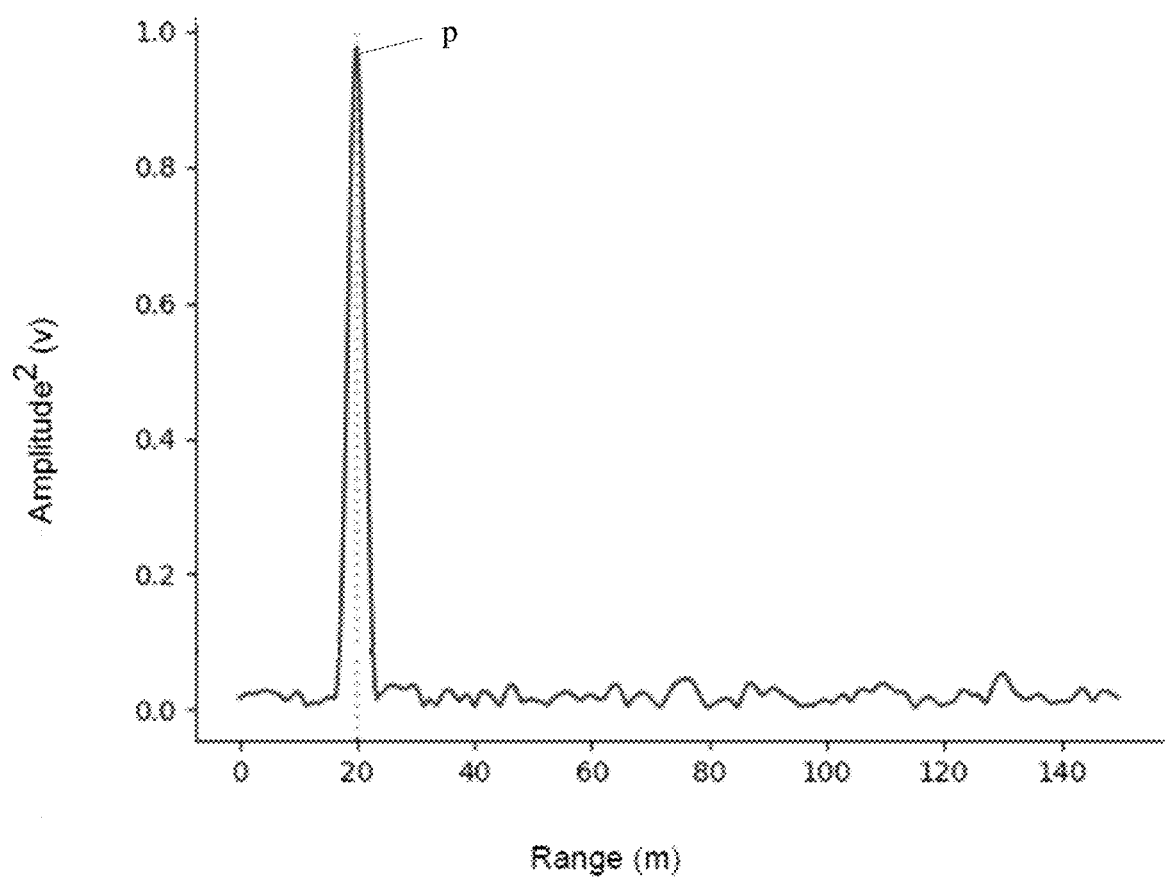
FIG. 3 is a chart showing a range correlation curve (RCC) of a true range of the EN of FIG. 2 during low multipath interference.

Referring to FIG. 3, there is shown a chart providing a range correlation curve (RCC) for an EN 20 response signal, in which the chart plots amplitude squared (in volts) versus range to the RP 22 (in meters).

Since the influence of multipath propagation may be absent or low in magnitude, the peak p of the chart may be taken as a true range of the EN 20 to one or more of the RPs 22. In this regard, the value of the peak p may be calculated according to the following:

$$r=(p*c)/(2*IFFT\_LEN*CH\_SPACING), \text{ in which}$$

p is the peak of the IFFT, c is the speed of light, IFFT_LEN is the number of samples in the IFFT, and CH_SPACING is the BLE channel spacing in Hz (nominally 2 MHz).

Here, it may be seen that the range, where the peak may be approximately 0.98 $v^2$, is about 20 m. The peak p may be referenced with regard to the observed noise floor (NF), i.e., the sum of all noise sources and unwanted signaling.

However, due to the influence of multipath which cannot be regarded as being absent or low in magnitude, i.e., when the aforementioned hop duplication and/or interpolation are necessary to implement, such true ranging may be obscured by various reflections and mixing products during hop processing.

Figure 4:
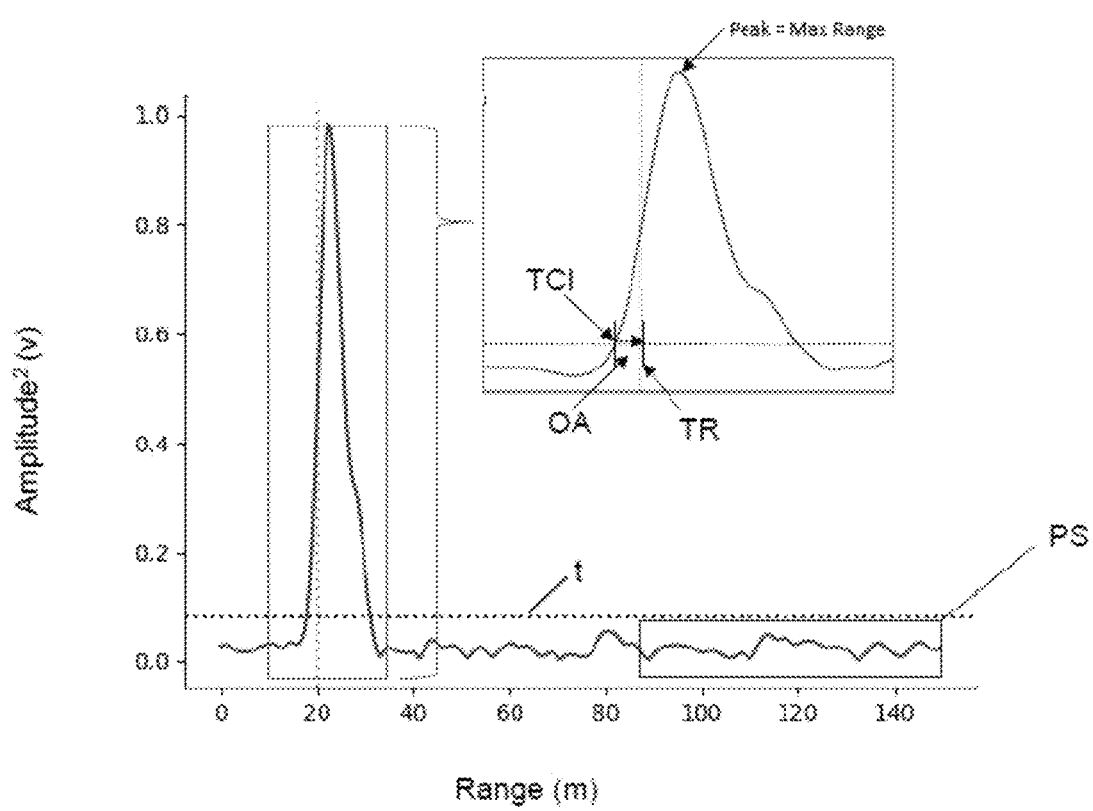
FIG. 4 is a chart showing a RCC according to embodiments herein.

Thus, with reference to FIG. 4, there is shown a RCC in which the influence of multipath is prevalent, such that when the aforementioned range of 20 meters is observed as a true range datum of the EN 20 relative to the RP 22, such true range does not coincide with or manifest as the peak of the monitored EN 20 signal as a result of multipath. Rather, the peak p becomes offset from the true range datum, and may be regarded as the EN's maximum range to the RP 22, i.e., the distance defining the outermost range limit that the EN 20 may be separated from the RP 22. In this regard, the maximum range may be understood as being defined by the peak amplitude according to a direct linear correspondence. For example, as shown in FIG. 4, the maximum range may be correlated to the peak at about 23 meters.

Because multipath may exist in a magnitude sufficient to skew the datum true range as shown in FIG. 3, it is then necessary to estimate an actual true range of the EN 20 to a respective one of the RPs that substantially removes multipath influence, i.e. results in the estimated true range substantially equaling the datum true range. Moreover, since the datum true range becomes skewed under the influence of multipath such that the peak p must be assigned as the maximum range, an estimated true range of the EN 20 may be determined via a threshold correspondence to the NF and an offset (described below).

In this way, and in order to remove corrupting influence of multipath so as to achieve the EN's estimated true range to a respective RP, the NF may be evaluated to establish a threshold therefor which accounts for multipath influence on the monitored EN 20 signal. The threshold may be established as $\alpha+(5\times\sigma)$, and indicated at "t," in which a and a respectively represent the standard deviation and maximum value of a predetermined number of samples (PS) within the RCC for the EN 20 signal. As an example, such predetermined number of samples may be, for example, at least 128, and the amount of standard deviation may likewise be otherwise configurable, i.e., predetermined, based on evaluation of the monitored EN 20 signal.

Once the threshold has been established, the EN may further reevaluate the RCC to first determine a threshold crossing index (TCI). That is, with exemplary reference to FIG. 4, the TCI may be defined and regarded as that portion of the RCC that first crosses the threshold t.

Since the estimated true range will, by definition, lay between the TCI and the maximum range, it is also therefore necessary to secondarily offset the TCI to compensate for windowing of each of the phase measurement samples corresponding to signals exchanged between the EN 20 and one or more RPs 22. To do so, an offset amount (OA) may be added to the TCI and variably determined based on the windowing of the aforementioned phase measurement samples derived from communications between the EN 20 and the RP 22. As such, the estimated true range in the presence of multipath may be comparatively the same as the datum true range given that the estimated true range may be determined as the sum of the TCI and the OA.

As an example, and upon inspection of FIG. 4, it may be seen that the TCI may be estimated at 17 meters, while the maximum range, when evaluated as the peak p of the RCC, corresponds to about 23 meters. Thus, assuming that the windowing function renders an OA of about 3 meters, the estimated true range may be regarded as being substantially equal to the datum true range of 20 m.

Based upon ranging to a plurality of the RPs 22 as shown in FIG. 2, for instance, the EN 20 is configured to determine its coordinate location with the space 23. In this regard, such coordinate location may be derived from the x,y,z, coordinates, i.e., position information, transmitted by each of the RPs 22.

To do so, the EN 14 may be equipped with any hardware and/or software enabling determination of its location within a three-dimensional space, such as space 23. Thus, through use of the known position information including coordinates $x_0,y_0,z_0$ to $x_3,y_3,z_3$ transmitted to the EN 20 by each of the four (4) RPs 22 within space, the EN 20 may then undertake to minimize a cost of error associated with determination of each true range corresponding to a respectively determined maximum range. To minimize the cost of error, the EN 20 may calculate a constrained gradient descent according to the following:

$$\min_{\vec{x}\in\Omega} f(\vec{x}),$$

where $f(\vec{x})$ represents the sum of squared or absolute error associated with the EN's determined estimated true range to each of the RPs 22, and $\Omega$ represents the set of coordinates defining a boundary generated by the maximum ranges to each of the respective RPs 22. In this way, $\Omega$ may be generated by the EN 20 as a constraint volume defining a location zone LZ within which the coordinate location of the EN 20 will reside. During calculation, if the above minimization determines a coordinate location of the EN 20 as laying outside of the constraint volume $\Omega$, such location may be further recalculated so as to be re-projected onto the constraint volume $\Omega$.

Figure 5:
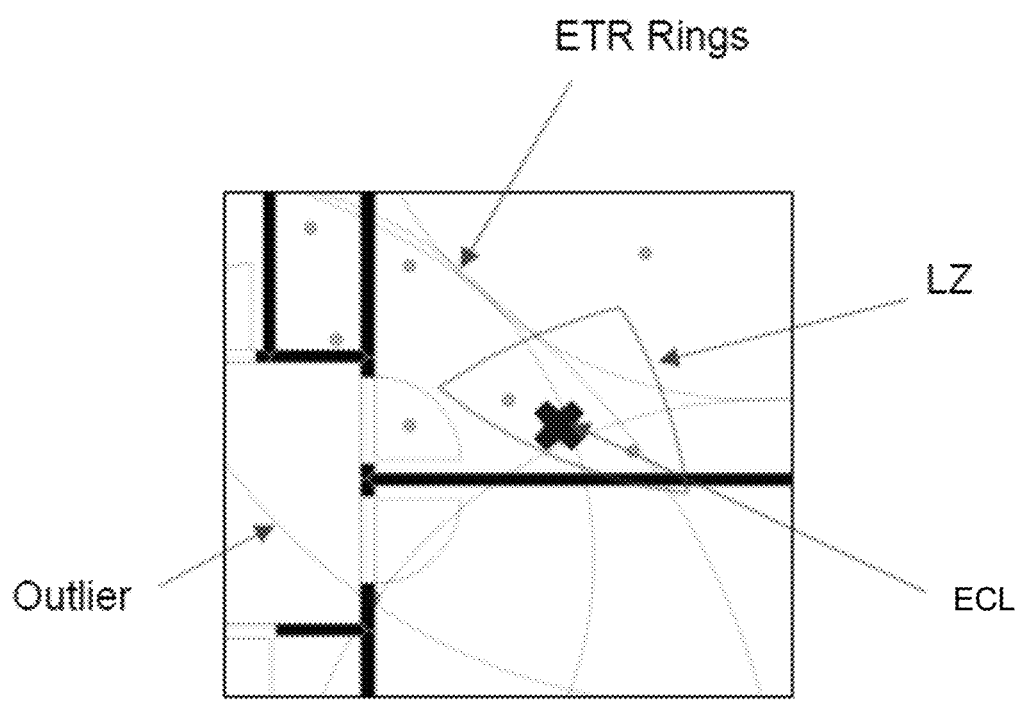
FIG. 5 is a schematic illustration showing a determination of a coordinate location of the EN of FIG. 2 according to embodiments herein.

Referring to FIG. 5, there is shown an illustrative floor plan depicting travel of the EN 20 (as indicated by the series of greyed dots) and the EN's range and coordinate location determinations as it moves about the floor plan and among the several RPs 22. During such movement, the graphical depiction(s) of FIG. 5 demonstrate the EN's estimation of its estimated true ranges to one or more RPs (not shown), via the shown estimated true range (ETR) rings. As shown, the rings expectedly aggregate within or through the constraint volume $\Omega$ in response to minimization of error associated therewith. As a result, the optimized coordinate location or estimated coordinate location (ECL) of the EN 20 may then be determined, as indicated in FIG. 5 Contrastingly, an inaccurate range determination, as an "outlier" with respect to the constraint volume, may be discarded when arriving at the ECL.

Figure 6:
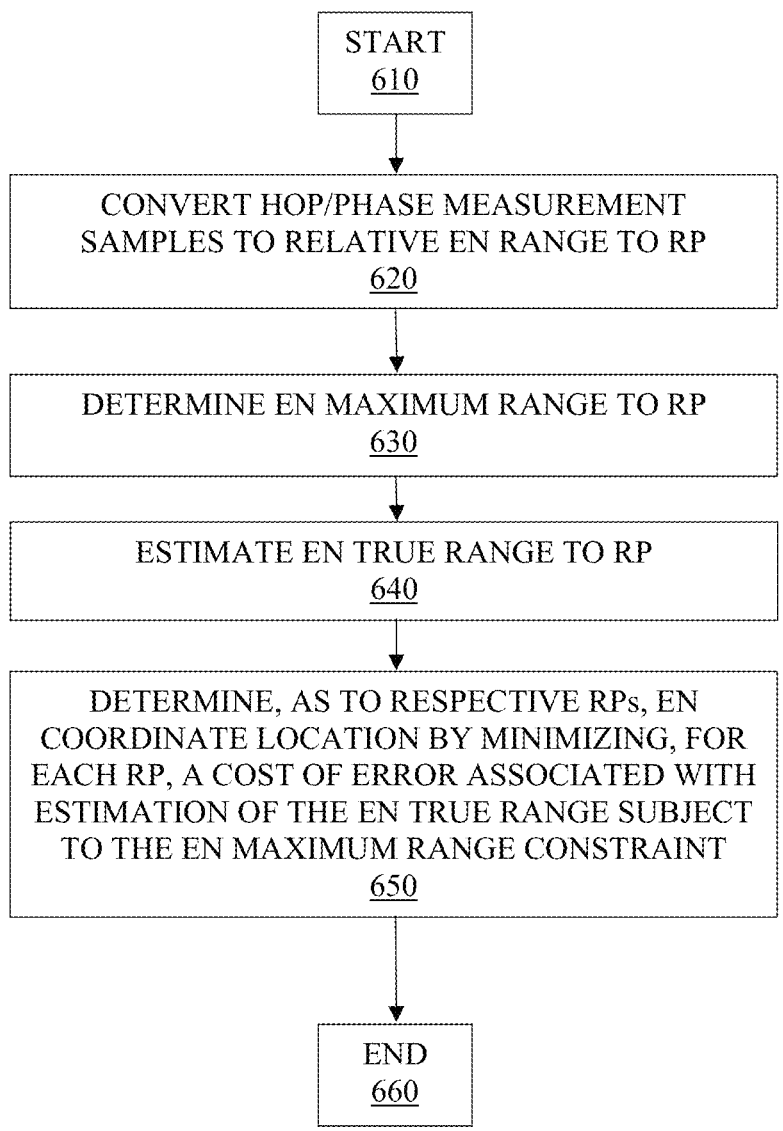
FIG. 6 is a high-level sequence diagram setting forth a manner of determining a coordinate location of the EN of FIG. 2 according to the RCC of FIG. 4.

Referring to FIG. 6, there is illustrated a high-level sequence diagram setting forth a manner in which the EN 20 may determine its coordinate location within the space 23 of FIG. 3. Beginning at 610, the EN 20 executes processing to, at 620, convert the EN's hop/phase measurement samples resulting from wireless communications among the EN 20 and the RP 22 to a relative range or distance to a respective RP 22. Once having acquired the relative range as at least a maximum range to the respective RP, the EN 20 undertakes generation of a RCC, as may be seen with respect to FIG. 4. Thereafter, the EN 20 evaluates the RCC to determine the peak p thereof, wherein, at 630, the EN 20 assigns the peak p as the maximum range of the EN 20 to the respective RP 22. Concurrently with such assignment, the EN 20 further evaluates the RCC, at 640, to determine its estimated true range to the respective RP 22. Once each of the maximum range and the estimated true range are determined with reference to the generated RCC, the EN 20 thereafter proceeds, at 650, to determine its coordinate location with space 23, for example, by minimizing, for each respective RP 22 from which it has received a beacon advertisement message, a cost of error associated with estimation of the true range subject to the maximum range constraint defined by the maximum ranges for each of the aforementioned RPs 22, before ending the process of FIG. 7 at 660. Though the EN 20 exemplifies a wireless communications node for executing each of operations 610-660, as described and according to FIG. 1.

Figure 7:
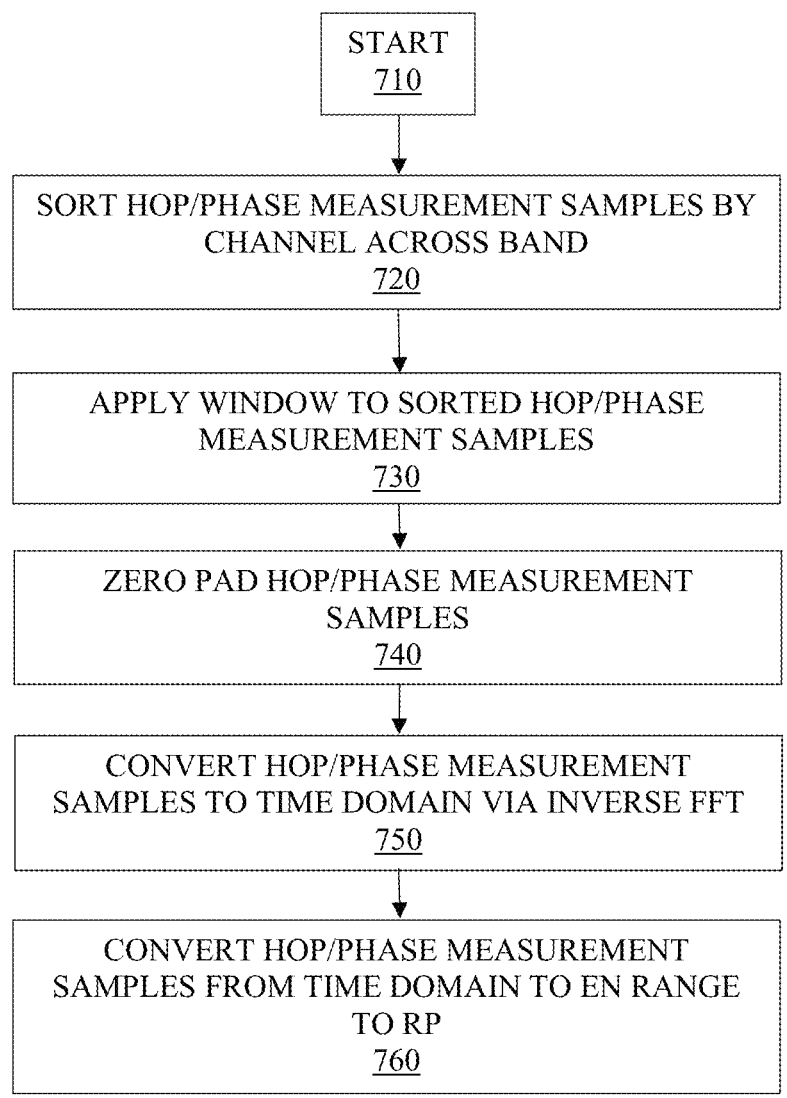
FIG. 7 is a sequence diagram setting forth a manner of conversion of EN hop/phase measurement samples to relative EN range to a respective RP of FIG. 2.

With reference to operation 620 above, FIG. 7 illustrates the process for converting hop/phase measurement samples to relative EN 20 range to a respective RP 22. Beginning at 710, the aforementioned samples are sorted by channel across the wireless band at 720. Then, the EN 20 applies windowing to the sorted samples at 730 prior to, at 740, subsequent zero padding. Throughout 750-760, the padded samples are first processed according to an IFFT prior to conversion to respectively determined ranges for one or more RPs 22, as discussed above.

Figure 8:
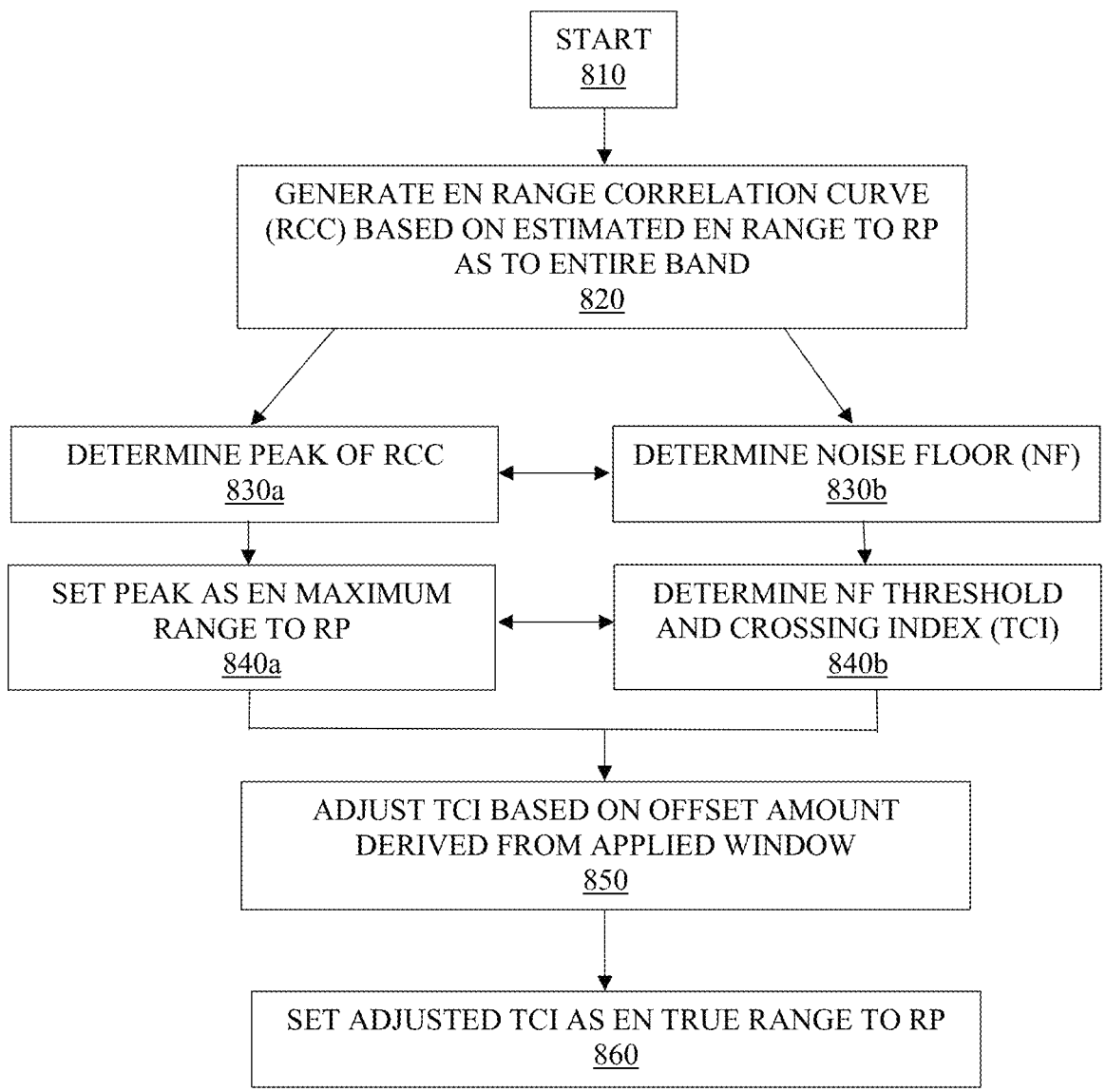
FIG. 8 is a sequence diagram setting forth a manner of determining both EN true and maximum ranges according to the RCC of FIG. 4.

With reference to operations 630-640 above and FIG. 8, once the EN 20 has determined range to one more respective RPs, it generates a RCC like that which is illustrated in FIG. 4 based on the IFFT for each RP 22 from which it has received a beacon advertisement message, as is indicated in FIG. 8 at 810-820. Once generated, the EN 20 undertakes to evaluate the RCC to determine the peak p of the RCC and set the same as the EN's maximum range to the RP 22, as at 830a-830b. Concurrently, the EN 20 evaluates the RCC to determine an estimated true range between the EN 20 and each respective RP 22. To do so, the EN determines the noise floor (NF), its threshold, and threshold crossing index (TCI) as at 830b and 840b and as discussed above. With the TCI being established, the EN 20 thereafter adjusts the TCI, as at 850, by an offset amount (OA) to account for windowing of each of the phase measurement samples corresponding to signals exchanged between the EN 20 and one or more RPs 22. Subsequent to the adjustment, the EN 20 may then set the adjusted TCI as the EN's estimated true range, whereby, in doing so, effects of multipath on the EN's ranging efforts are mitigated.

Figure 9:
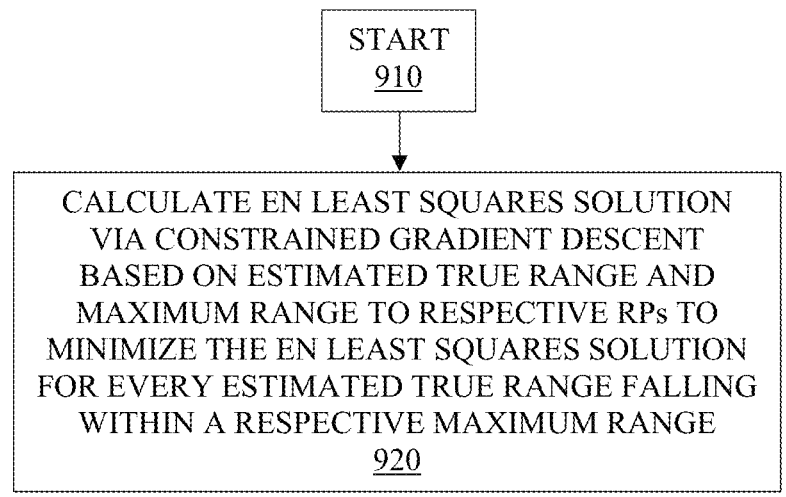
FIG. 9 is a sequence diagram setting forth a manner of determining a coordinate location of the EN of FIG. 2 according to the RCC of FIG. 4, wherein error associated with associated true and maximum ranges for each of respective RPs is minimized.

With reference to operation 650 above and FIG. 9, and based on each of the true range and the maximum range to each respective RP 22 from which a beacon advertisement message has been received, the EN 20 may then further derive its own coordinate location by trilaterating among the known coordinates of each such respective RP 22. To do so, the EN 20 calculates, as is indicated in FIG. 9 at 910-920, an appropriate least squares solution via calculation of a constrained gradient descent based on the aforementioned true and maximum ranges. In doing so, the EN 20 minimizes the aforementioned solution for every estimated true range falling within a determined maximum range.

In one or more embodiments, the EN 20 may be configured to include an accelerometer. In such a case, the EN 20 may be further configured to impose the constrained gradient descent on already obtained coordinate location determinations in response to the EN not moving, i.e., being at a standstill. As such, continued application of the constrained gradient descent may occur wherein the EN 20 may update, i.e., swap out, previously obtained maximum ranges to RPs 22 for newly acquired maximum ranges wherein one or more of such newly acquired maximum ranges is lesser in magnitude. In this way, the constraint volume Ω, representing the location zone LZ containing respective RP 22 true ranging, may be further tightened or restricted so as to result in an EN 20 coordinate location having enhanced confidence, i.e., decreased margin of error.

When determining its ranging and coordinate location determination, it is to be understood that the EN 20 may employ not only a single set of RPs 22, but multiples thereof in order to more accurately evaluate its position in a three-dimensional space. In other words, the EN 20 may determine its coordinate location from among multiple sets of RPs 22 in which each set includes a plurality, and optionally four (4) RPs 22, which may or may not be exclusive to another set thereof. For example, first and second sets of RPs 22 may include ones which may be common to each other so long as one among those sets is not common to such first and second sets. In other words, the first and second sets of RPs 22 may be free of at least a shared RP, such that each of the first and second sets of RPs is a unique set thereof, by definition. Furthermore, should the communicating RPs 22 be arranged at a same height, i.e., at a same z coordinate, the EN 20 may execute a subsequent iterative, non-linear least squares calculation to arrive at its coordinate location relative to the communicating RPs 22.

In view of the above, it will be recognized that, by enacting each of the above maximum and estimated true range determinations, as well as the imposition of constrained gradient descent on coordinate determination, that the EN 20 realizes at least several below-described advantages affording a practical application of its processing.

First, and because the EN 20 optimizes its operation to substantially mitigate multipath interference, a size of the EN 20 resulting from decreased battery capacity may otherwise be reduced when compared to such an EN 20 that is not equipped for such optimization. This is the case since, for example, unnecessary iterative measurement of ranging to a given RP 22 is reduced when determining an estimated true range. Said otherwise, ranging by the EN 20 may be empirically proven to be superior to another EN which is not equipped to operate as described herein. Furthermore, because ranging is optimized, determination of the EN's coordinate location is also optimized, thus avoiding the need for recalculation and commensurate increased battery capacity.

Second, and because the EN 20 optimizes its operation to substantially mitigate multipath interference as described herein, such aforementioned avoidance of iterative measurement of ranging and recalculation of coordinate location effects conservation of battery usage. As a result, the EN 20 experiences increased longevity so as to be available for more extended and varied applications such as those involved when tracking various resources.

Should the communicating RPs 22 be arranged at a same height, i.e., at a same z coordinate, the EN 20 may execute a subsequent iterative, non-linear least squares calculation to arrive at its coordinate location relative to the communicating RPs 22.

Whether multipath interference may be an obstacle to overcome, efforts to optimize ranging to one or more RPs 22 in order to increase EN 20 communications and ranging capacity and to also mitigate the effect of co-location of RPs 22 remain in focus. Embodiments hereinbelow contemplate that such efforts may be undertaken in conjunction with the EN ranging and coordinate location techniques described above with reference to FIGS. 3-9. However, such embodiments present a supplemental manner of selectively determining which RPs 22 may be chosen by the EN 20 for its ranging determination. In particular, such embodiments address clustering one or more RPs 22 from within an area, such as space 23, to which the EN 20 may range its relative distance and thereafter determine, based on a respectively relative RP distance or distances, its coordinate location within space 23. In these ways, and specifically because a cluster of one or more RPs 22 may be targeted or selected for a ranging determination, an EN's ranging capacity, i.e., the number of RPs 22 that may be used in arriving at the ranging determination, may be increased simply by co-locating RPs 22. Herein, the terms "clustering" and "cluster" may mean, but not be limited to, "assembling" or "collecting" and "assemble" or "collect."

Figure 10:
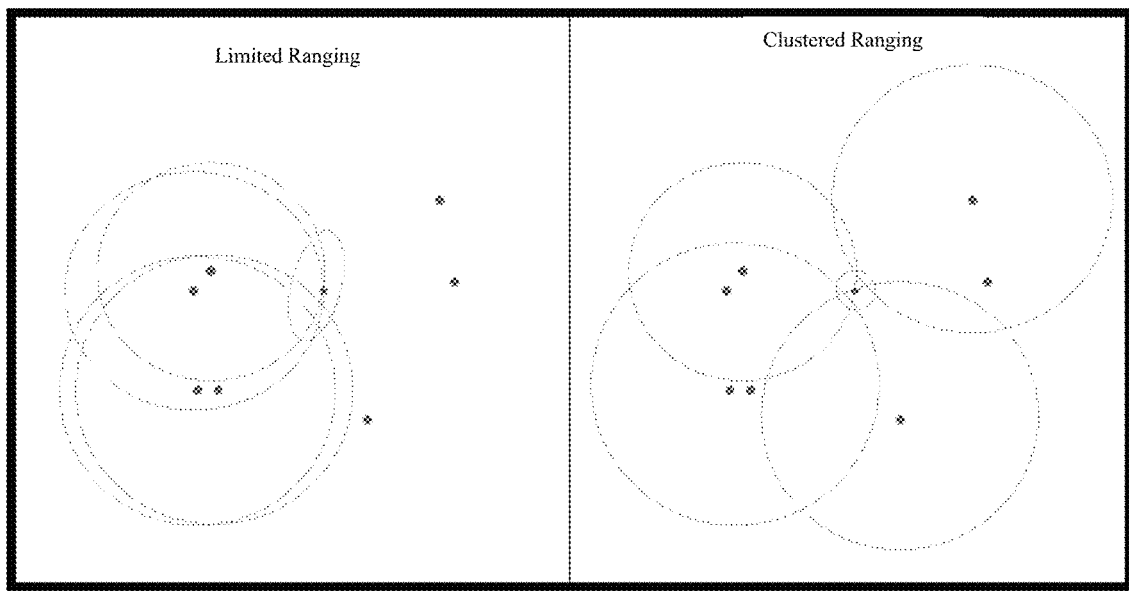
FIG. 10 is a comparative illustration of coordinate location determination of the EN, based on ranging to a variety of RPs used in determining such coordinate location.

Referring to FIG. 10, there is shown a comparative illustration of coordinate location of an EN 20, based on ranging to a variety of RPs 22. The left hand side of the figure demonstrates an instance in which the EN's ranging ability is limited by a capacity therefor among RPs 22 due to, for example, processing capability for communications with multiple RPs at a given time. Thus, RPs 22 in upper and lower right quadrants may not be taken into account. As a result, only RPs 22 remaining in the upper and lower left quadrants may be factored into the EN's coordinate location determination. Because of this situation, and as is shown by the overlap and coincidence of the range rings resulting from trilateration performed by the EN 20, the EN 20 may derive a lower confidence location determination. This is unlike the depiction shown on the right hand side of the figure in which each of the RPs 22 has been accounted for, as is indicated by the generated range rings. Thus, due to the inclusion of each of the RPs 22 as a result of the clustering technique described hereinbelow, it is contemplated that the EN 20 may achieve a significantly higher level of confidence with respect to its location determination when trilaterating its position.

Figure 11:
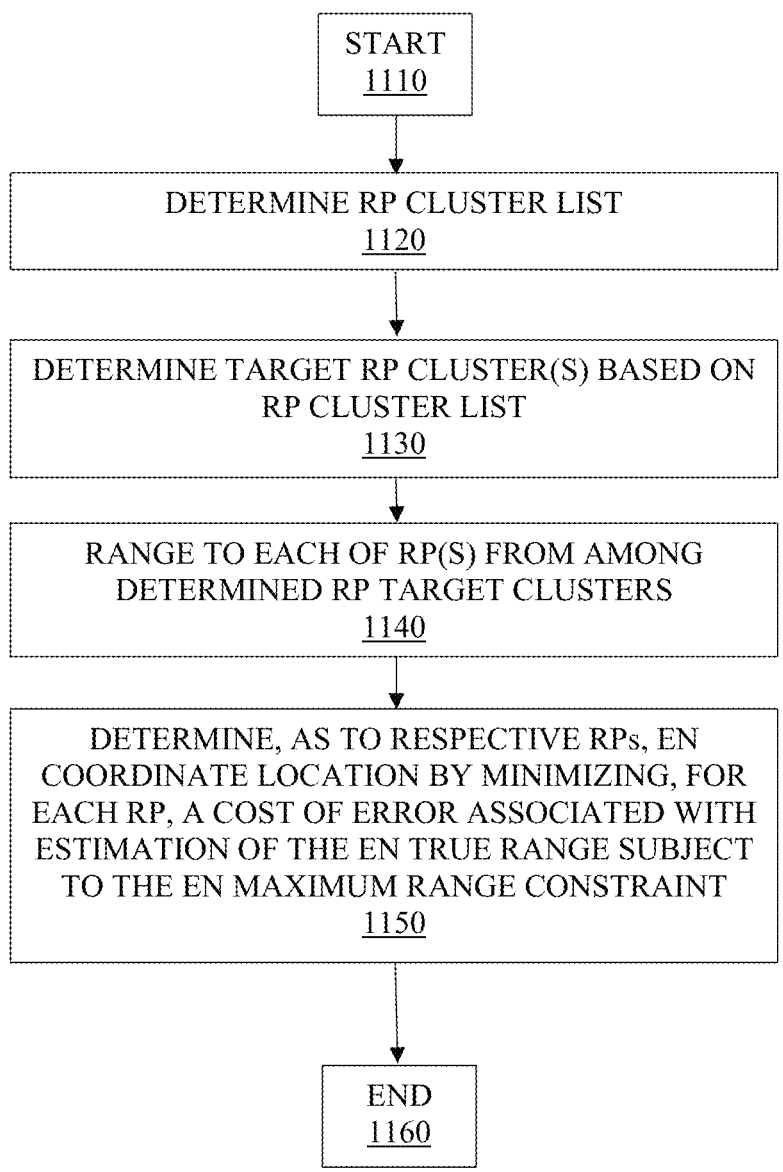
FIG. 11 is a high-level sequence diagram setting forth a manner of determining a coordinate location of the EN according to embodiments for clustering RPs.

Referring to FIG. 11, there is shown a high-level sequence diagram setting forth a manner in which the EN 20 may determine its coordinate location based on clustering of RPs 22.

As will be understood, each of EN 20 and RP 22, in conjunction with their constructions as detailed herein, may be configured with all appropriate software and/or hardware, including one or more processors and storage which may be necessary for implementing their respective wireless communications, including their transmission, receipt and processing of information to determine parameters, constructions and quantities as discussed herein.

The process may start at 1110 and proceeds to 1120 whereat the EN 20 first determines or compiles a listing of RP 22 clusters containing one or more RPs 22 which may be used in the ranging that defines the EN 20 coordinate location.

At 1130, the EN 20 determines, from the compiled listing created in 1120, one or more target RP 22 clusters which may be selectively chosen as containing the RPs 22 which will contribute ranging criteria, e.g., RP 22 coordinates, as bases to determine its coordinate location.

At 1150, and before ending the process at 1160, the EN 20 undertakes to determine, as to RPs 22 of selected RP 22 clusters, its coordinate location by, in a similar manner as operation 650 of FIG. 6, minimizing, for each RP 22 selected among the targeted clusters, a cost of error associated with estimation of the EN's true range to such RP 22 subject to a maximum range constraint therefor as defined by a maximum range from the EN 20 to the RP 22.

Figure 12:
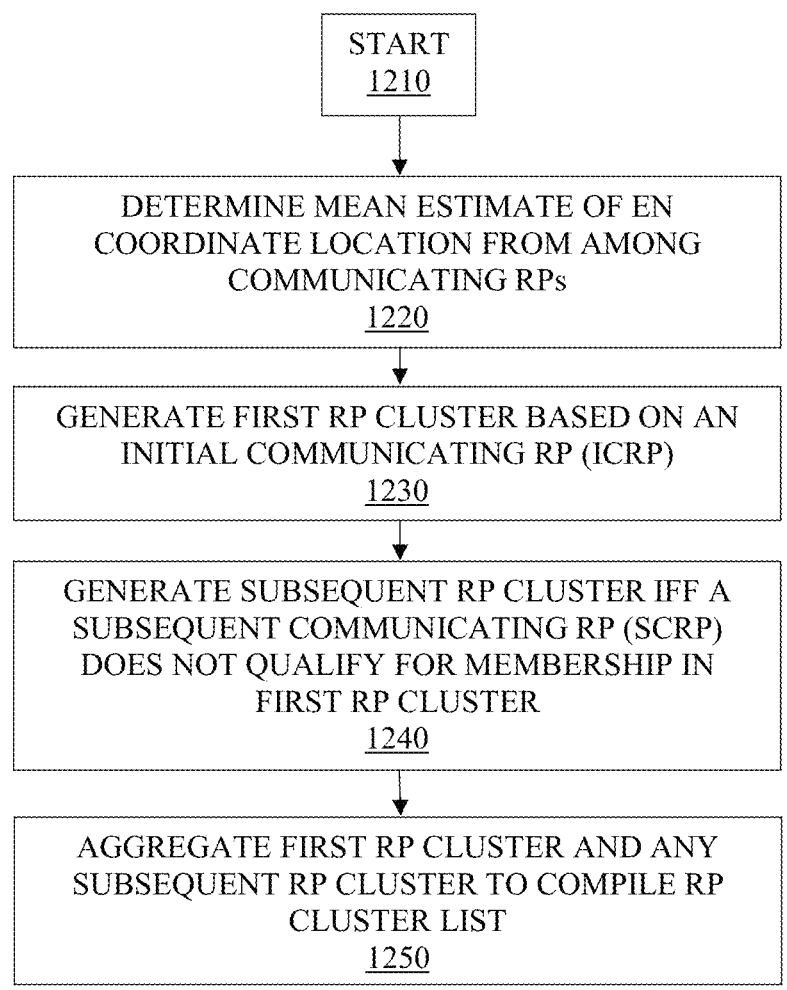
FIG. 12 is a sequence diagram setting forth a manner of determining a listing of RP clusters according to embodiments herein.

In these regards, FIGS. 12-14 illustrate a manner of the EN's determination of a listing of RP 22 clusters containing individual RPs 22 to which ranging therein may be made in order to arrive at its coordinate location determination.

Referring to FIG. 12 and to explain operation 1120 regarding the EN's determination of its listing of RP 22 clusters, the process begins at 1210 in which the EN 20 initiates a scan for beacon advertisement messages which have been transmitted and are receivable from one or more RPs 22. In conducting the scan, the EN 20 receives from each of the RPs 22 corresponding coordinate location in space 23. With such information, the EN 20 stores the order of receipt of the beacon advertisement messages in order and according to the identifying coordinate information. After aggregating the coordinate information, the EN 20 determines, at 1220, a mean estimate thereof, i.e., the quotient of the summed coordinates of RPs 22 divided by the number of corresponding RPs 22, as its mean estimate coordinate location. At 1230, the EN 20 generates a first RP 22 cluster containing the first or initial communicating RP 22 (ICRP) from which it received and stored associated coordinates. At 1240, the EN 20 may generate a second and further subsequent RP 22 cluster(s) if and only if (i.e., IFF) a second or more communicating RP 22 (SCRP) does not qualify for membership, i.e., does not qualify to be added to the first RP 22 cluster. After having determined the appropriate number of RP 22 clusters, the EN 20 thereafter compiles a RP 22 cluster listing thereof and stores the same.

Referring to FIG. 13, and to explain operation 1230 detailing generation of the first RP 22 cluster and aspects thereof, the process starts at 1310 and proceeds to 1320, whereat the coordinate of the ICRP 22 is assigned as the centroid of the first RP 22 cluster. At 1330, the EN 20 proceeds to determine the distance from the EN 20 to the assigned centroid, i.e. the centroid distance. To do so, the EN 20 generates such centroid distance as the difference between the centroid and the estimated mean of the EN's coordinate location. Once the first RP 22 cluster is determined, the EN 20 further generates a cluster zone representing a distance from the determined centroid that defines a threshold distance for inclusion of a SCRP 22 within that same first RP 22 cluster. The threshold distance may be calculated as the product of the first RP 22 centroid distance and a predetermined visibility factor. In this regard, the visibility factor may comprise a distance scalar and may be predetermined in magnitude to represent a horizon for or limit on sizing of the first RP 22 cluster. For example, and with reference to FIG. 13A illustrating an instance of the first RP 22 cluster C1, the product of the centroid distance from the first RP 22 cluster C1 centroid to the EN 20 and the visibility factor yields the threshold distance TD (as an exemplary radius from the RP 22 centroid), which thus serves to define a sizing for the zone Z of the first RP 22 cluster C1. As discussed below, the SCRP 22 may be included in a cluster, such as the first RP 22 cluster C1.

Having determined the first RP 22 cluster and aspects thereof, based on the ICRP 22, the EN further undertakes to consider, with respect to others of RPs 22 from which it has received beacon advertisement messages, whether one or more of such other RPs 22 should be included in the first RP 22 cluster. That is, the EN undertakes to consider whether the SCRP 22 qualifies for membership in the first RP 22 cluster.

Thus, referring to FIG. 14, and to explain operation 1240 regarding whether the SCRP 22 should be included in the first RP 22 cluster, the process begins at 1410 and proceeds to operation 1420. Threat, the EN 20 determines qualifying membership according to whether the Euclidean distance between the SCRP 22 and the centroid of the first RP 22 cluster C1 is less than or equal to ($\leq$) i.e., falls within, the first RP 22 cluster threshold distance TD. If so, the EN 20 includes the SCRP 22 in the first RP 22 cluster C1, at 1430, (see FIG. 13A) and proceeds to 1440 whereat the EN 20 recalculates the first RP 22 threshold distance TD by repeating operations 1320-1340, with respect to the added SCRP 22. That is, the first RP 22 cluster centroid may be recalculated based on the average of the coordinates of the first RP 22 and the SCRP 22, and thereafter, the threshold distance TD may then be based on the recalculated first RP 22 cluster C1 centroid. However, if such Euclidean distance is greater, the EN 20 generates a new RP 22 cluster containing the SCRP 22, at 1450, and executes, at 1460, operations 1320-1340, with respect to the SCRP 22. In this regard, it will be understood that operations 1420-1460 may be undertaken by the EN 20, on an ongoing basis with respect to any other RP 22 which may thereafter transmit a beacon advertisement message that is received by the EN 20.

Once the EN 20 has generated each of its determined clusters of RPs 22, a priority thereamong may be determined in order to optimize ranging to individual RPs 22 contained within each of those clusters.

Figure 15:
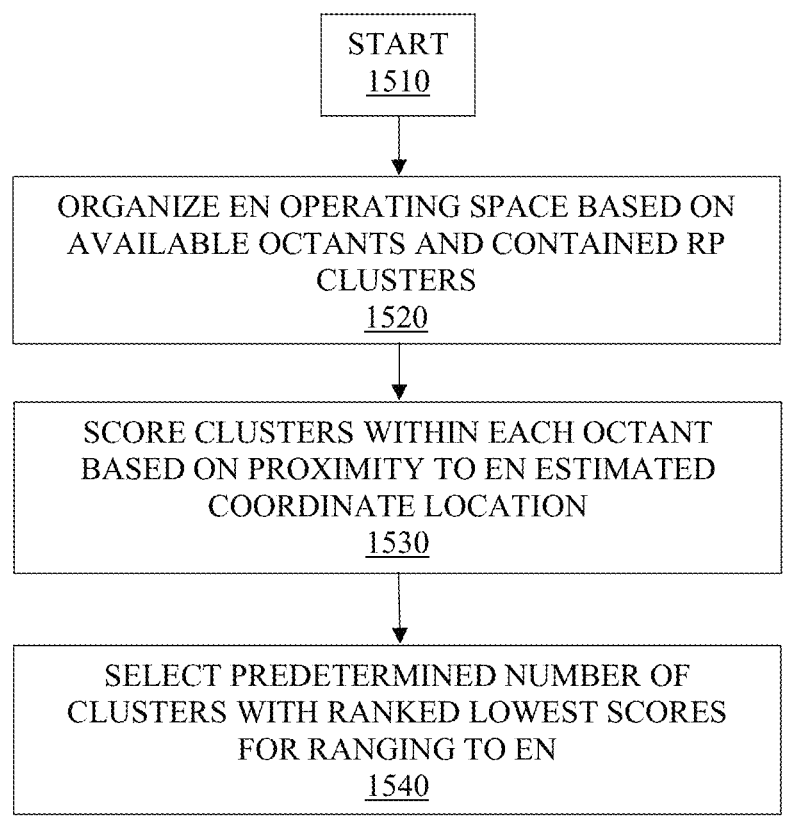
FIG. 15 is a sequence diagram setting forth a manner of determining target RP clusters from among the listing of RP clusters of FIG. 12 that may include the first RP cluster of FIG. 13 and the subsequent RP cluster of FIG. 14.

Thus, in referring to FIG. 15, and to explain operation 1130 regarding the EN's determination of which RP 22 clusters ought to be selected or targeted for ranging a distance between the EN 20 and given RPs 22 within a cluster, the process begins at 1510 and proceeds to 1520. Threat, the EN 20 divides the space 23 into octants, at 1520. Thereafter, at 1530 and to measure proximity to the EN 20 based on the distance between the mean estimated coordinate location of the EN 20 and a given cluster centroid, each cluster within each octant is ranked according to score ($\rho$) as to a given octant, as determined by the following equation, in which:

$$\rho = \|\delta\|_2 + 2 \times ||\delta_x| - |\delta_y||, \text{ wherein}$$

$\delta$ represents the coordinate of a given cluster centroid relative to the EN's estimated mean coordinate location, $\|\delta\|_2$ represents the Euclidean or 2-norm of $\delta$, and $\delta_x$, $\delta_y$ represent the x and y components of $\delta$, respectively. Since clusters which lay nearer to a line passing through the midpoint of the EN 20 and a given octant may be considered to be geometrically nearer, i.e., most proximate, the EN 20, the aforementioned determination may result in a cluster comprising a lower, i.e., preferred, score p than does another a cluster within the same octant. In this context, $\|\delta\|_2$ biases the score $\rho$ of a given cluster toward selection, as $||\delta_x| - |\delta_y||$ biases the score $\rho$ of a given cluster in a center of an octant toward selection since the score is minimized when $|x| = |y|$.

Thus, based on the above, the EN 20 may selectively determine, i.e., target, those RP 22 clusters from its compiled RP 22 cluster list that have achieved a desired lowest-ranking score, in each octant, in which the score indicates nearness in proximity to the EN 20. The number of RP 22 clusters to be selected within each octant according to such lowest-ranking may be predetermined to be more than one, and thus respective scores may be graduated. Once this determination is made, the EN may then select a predetermined number of lowest-ranking RP 22 clusters within a given octant as being eligible to provide RPs 22 for ranging to the EN 20.

Since the EN 20 may be configured to determine its coordinate location based on a predetermined number of RP 22 ranges, and there may exist an insufficient number of octants with the predetermined number of RP 22 clusters (due to layout of space 23, for example), the EN 20 may be configured to satisfy the predetermined number of RPs by counting as eligible a sufficient number of lowest-ranking RP 22 clusters from octants with more than one RP 22 cluster. Similarly, should the predetermined number of RP 22 clusters (providing the predetermined number of RP 22 ranges) not be available, the EN 20 may be configured to satisfy the predetermined number of RP 22 ranges by accepting multiple ranges from lowest-ranking RP 22 clusters having more than one RP 22.

Based on the above evaluations, the EN 20 proceeds to execute operation 1540 whereat those RP 22 clusters having lowest-ranking scores, as described above, are selected as being eligible to provide one or more RPs 22 from which the EN 20 may determine its range, i.e., relative distance.

After having determined those clusters of RPs 22 that have been targeted, according to their lowest ranking score, the EN 20 proceeds to range its distance to one or more of RPs 22 which define the aforementioned targeted clusters. In this regard, the EN 20 may range to one or more of the RPs 22 defining a respective targeted cluster in order to determine its coordinate location within space 23.

Figure 16:
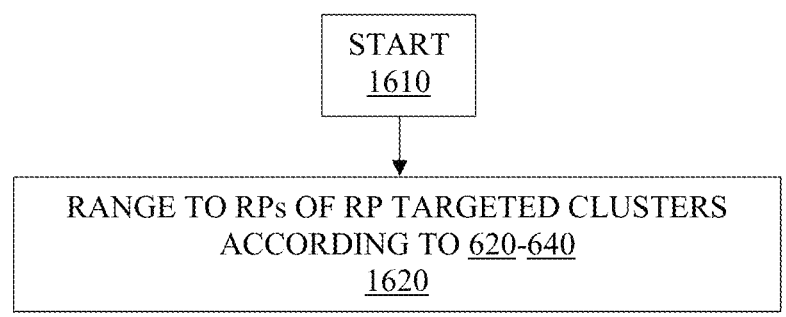
FIG. 16 is a sequence diagram setting forth a manner of EN ranging to one or more of the target RP clusters of FIG. 15.

Thus, when referring to FIG. 16, and to explain operation 1140, the process begins at 1610 and proceeds to 1620 whereat the EN 20 undertakes calculation of those true and maximum ranges of signaling transmitted from one or more of the RPs 22 within a given, targeted cluster, according to operations 620-640.

Figure 17:
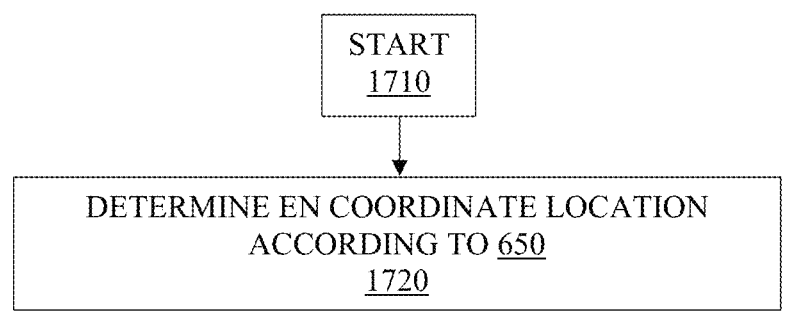
FIG. 17 is a sequence diagram setting forth a manner of EN coordinate location determination based on the EN ranging of FIG. 16.

With the above ranges having been acquired, and when referring to FIG. 17 to explain operation 1150, the EN 20 then undertakes to determine its coordinate location according to operation 650, as is described above.

Figure 18A:
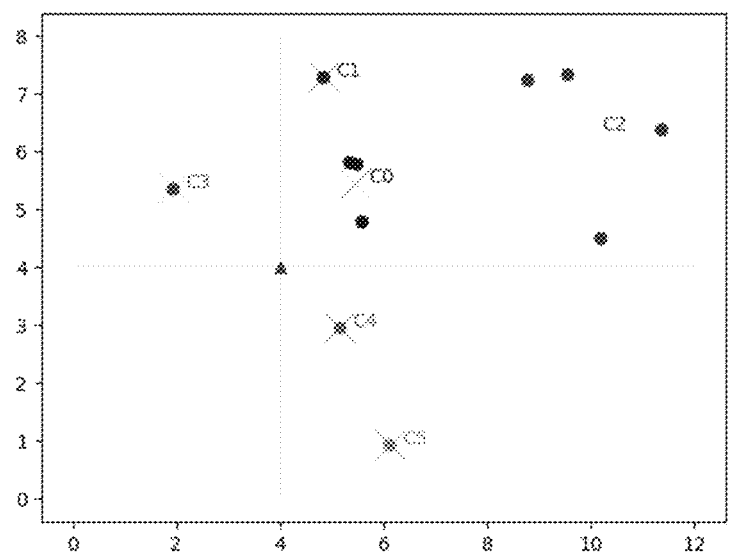
FIGS. 18A and 18B are schematic representations of EN cluster targeting according to, for example, the listing of RP clusters of FIG. 12.
Figure 18B:
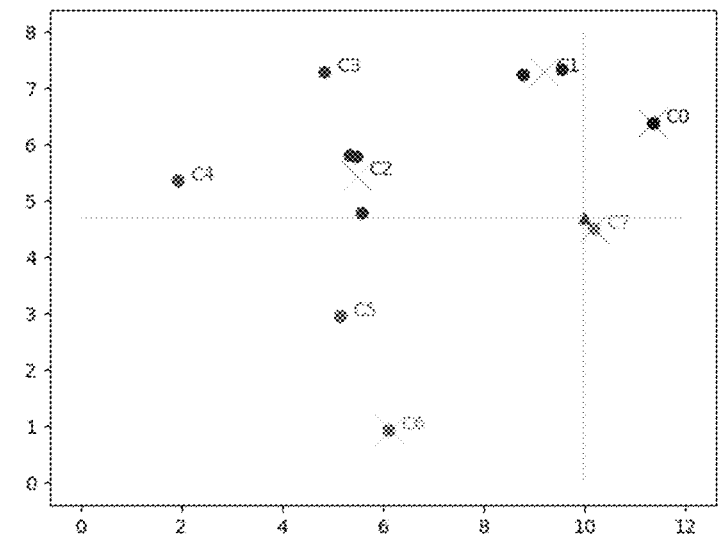

FIGS. 18A and 18B are schematic representations of targeting of clusters according to operation 1130 and resulting EN 20 coordinate location according to operations 1140-1150, in which clusters within octants (or quadrants as shown in the two dimensional (2D) depiction thereof) that have been selected as being eligible to provide RPs 22 for use in the EN's ranging determination(s) are numerically represented as, for example, "C1," etc. Numbers along the x and y axes represent coordinate location, wherein particular clusters within a quadrant are respectively numbered to include RPs 22 therein as represented by a variable number of dots. The EN 20 is represented by a triangle or $\Delta$, and has an exemplary coordinate of (4,4) in FIG. 18A and an exemplary coordinate of (10,5) in FIG. 18B.

In accordance with operation 1120, and with reference to FIG. 18A, clusters 0, 1, 3, 4, and 5 have been targeted (as indicated by an associated "X") as being eligible to provide RPs 22 which may be used in the EN's ranging determination(s). Notably, the quadrant having its center at (2,2) does not contain any cluster; thus, the EN 20 may rely upon one or more of clusters 0, 1, 3, 4, and 5 in executing its ranging determination(s). With reference to FIG. 18B, clusters 0, 1, 2, 6, and 7 have been targeted as being eligible to provide RPs 22 which may be used in the EN's ranging determination(s). Notably, cluster 6 has been preferred over cluster 5 due to it being nearing in proximity to a center of the EN 20.

Figure 19:
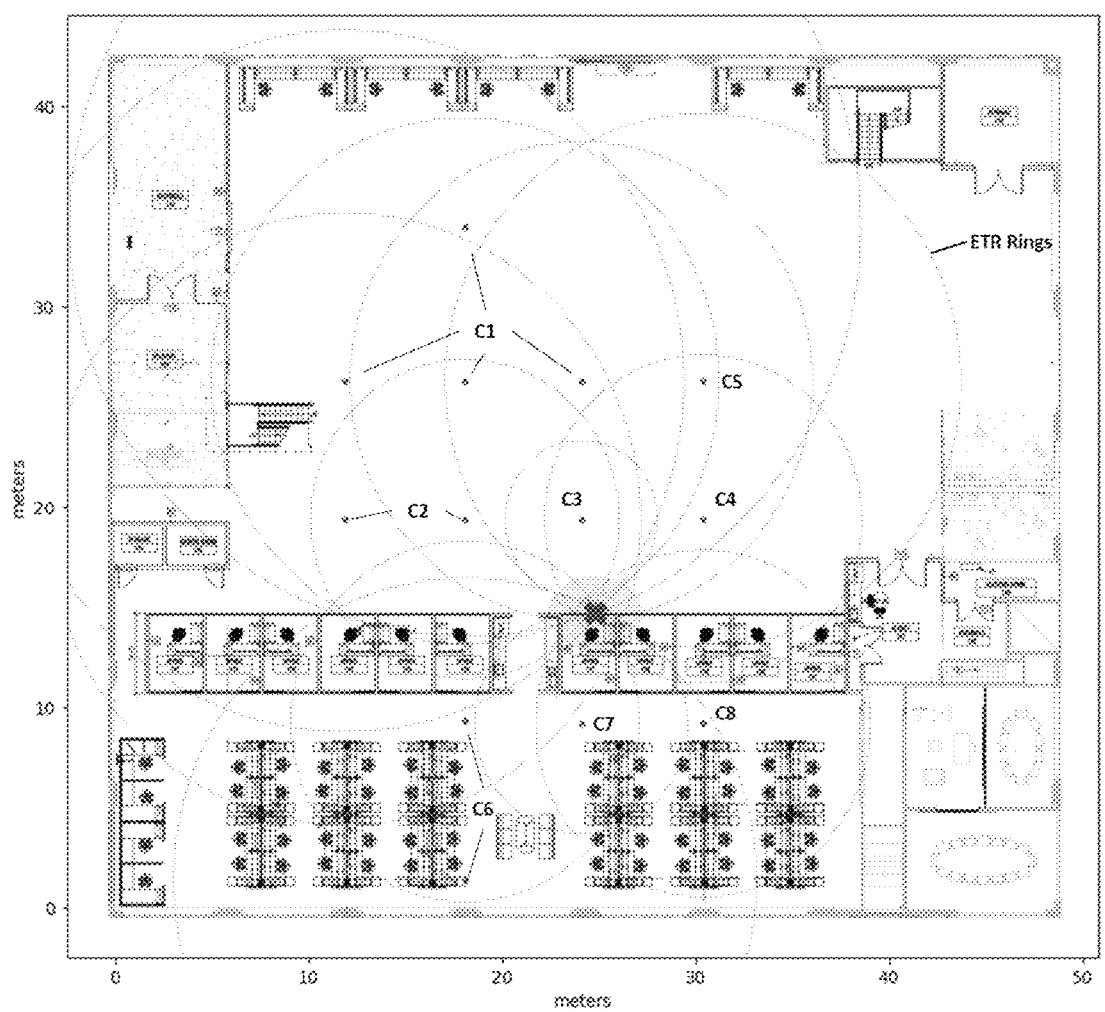
FIG. 19 is a schematic representation of an exemplary floorplan including an exemplary coordinate location of an EN with respect to such floorplan.

Referring to FIG. 19, there is shown a schematic representation of an exemplary floorplan including an exemplary coordinate location of an EN with respect to such floorplan. That is, the floorplan may be exemplary of space 23. As will be understood from embodiments described hereinabove, the EN conducts ranging to one or more clusters of RPs 22, indicated as "C," and develops its ETR Rings to subsequently determine its coordinate location at the location denoted by "X." In this way, it will be further understood that such coordinate location is derived with optimized efficiency enabling the determination of that location by an EN 20 that, as described above, may be reduced in size and enjoy longevity in battery capacity, when compared with EN's not configured according to present embodiments.

As will be appreciated from the above, the EN 20 may be configured to re-execute the processes entailed by operations 1110-1160 so as to further hone its coordinate location. For example, instead of determining its mean coordinate location as the datum from which RP centroid distances may be calculated, such distances may be calculated with reference to the EN 20 coordinate location derived from ranging to one or more RPs 22 of one or more selectively determined clusters. This way, the coordinate location of the EN 20 may be further refined to heighten coordinate location accuracy within a setting such as that depicted by FIG. 19.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A wireless communications node (WCN) configured to, within a given space, receive reference point (RP) coordinates included in beacon advertisement messages transmitted from a plurality of RPs, the WCN comprising:
one or more processors configured to execute a set of instructions comprising:
determining an estimated coordinate location of the WCN based on the coordinates of each of the plurality of RPs;
arranging one or more of plurality of RPs into a first cluster and at least another cluster thereof;
determining whether the first cluster or the at least another cluster is most proximate to the estimated coordinate location of the WCN;
determining an estimated true range of the WCN to one or more of the RPs included in the cluster determined to be most proximate to the estimated coordinate location of the WCN; and
based on the one or more estimated true ranges, determining a coordinate location of the WCN,
wherein
the estimated coordinate location of the WCN comprises the quotient of a sum of each of the RP coordinates of each of the plurality of RPs divided by the total number of the plurality of RPs, and
a centroid of the first cluster comprises the coordinate of a first RP of the plurality of RPs from which the WCN received the respective beacon advertisement message thereof.

2. The WCN of claim 1, wherein:
a centroid of the at least another cluster comprises the coordinate of at least another RP of the plurality of RPs.

3. The WCN of claim 2, wherein:
the WCN is configured to determine whether the first cluster or the at least another cluster is most proximate to the estimated coordinate location of the WCN based on a comparison between a distance between the centroid of the first cluster and the estimated coordinate location of the WCN and a distance between the centroid of the at least another cluster and the estimated coordinate location of the WCN.

4. The WCN of claim 3, wherein:
the distance between the centroid of the first cluster and the estimated coordinate location of the WCN comprises a first Euclidean distance between the centroid of the first cluster and the estimated coordinate location of the WCN, and the distance between the centroid of the at least another cluster and the estimated coordinate location of the WCN comprises a second Euclidean distance between the centroid of the at least another cluster and the estimated coordinate location of the WCN.

5. The WCN of claim 4, wherein:
a first cluster zone of the first cluster defines a distance from the centroid of the first cluster according to the product of the distance between the centroid of the first cluster and the estimated coordinate location of the WCN and a predetermined visibility factor.

6. The WCN of claim 5, wherein:
the predetermined visibility factor comprises a distance scalar representing a limit on sizing of the first cluster.

7. The WCN of claim 6, wherein:
if the Euclidean distance between the at least another RP of the plurality of RPs and the centroid of the first cluster falls within the first cluster zone, the WCN is configured to include the at least another RP of the plurality of RPs within the first cluster.

8. The WCN of claim 7, wherein:
the centroid of the first cluster including each of the first RP and the at least another RP of the plurality of RPs comprises the quotient of a sum of the coordinates of the first RP and the at least another RP of the plurality of RPs divided by a sum of the total number of the first RP and the at least another RP of the plurality of RPs.

9. The WCN of claim 8, wherein:
if the Euclidean distance between the at least another RP and the centroid of the first cluster does not fall within the first cluster zone, the WCN is configured to generate the at least another cluster and to include therein the at least another RP of the plurality of RPs.

10. The WCN of claim 9, wherein:
the WCN is configured to separate the given space into octants based on the received coordinates of the plurality of RPs.

11. The WCN of claim 10, wherein:
the WCN is configured to selectively determine a predetermined number of clusters, from among octants including any of the first cluster and/or the at least another cluster, as being eligible, according to a determination that any of the first cluster and/or at the at least another cluster is most proximate to the estimated coordinate location of the WCN, to include one or more of the RPs thereof to which the WCN is configured to determine the estimated true ranges thereto, and to generate a listing of said selectively determined clusters.

12. The WCN of claim 11, wherein:
each estimated true range of the WCN is based on a respectively determined estimated true range to the one or more RPs included in the selectively determined clusters.

13. The WCN of claim 12, wherein:
the WCN is configured to iteratively determine whether the first cluster or the at least another cluster is most proximate the WCN, based on the respectively determined coordinate location of the WCN as defined by the respectively determined estimated true range to the one or more RPs included in the selectively determined clusters.

14. A method of locating a wireless communications node (WCN) within a given space, comprising:
receiving, at the WCN, reference point (RP) coordinates included in beacon advertisement messages transmitted from a plurality of RPs;

determining, at the WCN, an estimated coordinate location of the WCN based on the coordinates of each of the plurality of RPs;
arranging, at the WCN, one or more of plurality of RPs into a first cluster and at least another cluster thereof;
determining, at the WCN, whether the first cluster or the at least another cluster is most proximate to the estimated coordinate location of the WCN;
determining, at the WCN, an estimated true range of the WCN to one or more of the RPs included in the cluster determined to be most proximate to the estimated coordinate location of the WCN; and
based on the one or more estimated true ranges, determining, at the WCN, a coordinate location of the WCN, wherein
the estimated coordinate location of the WCN comprises the quotient of a sum of each of the RP coordinates of each of the plurality of RPs divided by the total number of the plurality of RPs, and
a centroid of the first cluster comprises the coordinate of a first RP of the plurality of RPs from which the WCN received the respective beacon advertisement message thereof.

15. The method of claim 14, wherein:
a centroid of the at least another cluster comprises the coordinate of at least another RP of the plurality of RPs.

16. The method of claim 15, further comprising:
determining, at the WCN, whether the first cluster or the at least another cluster is most proximate to the estimated coordinate location of the WCN based on a comparison between a distance between the centroid of the first cluster and the estimated coordinate location of the WCN and a distance between the centroid of the at least another cluster and the estimated coordinate location of the WCN.

17. The method of claim 16, wherein:
the distance between the centroid of the first cluster and the estimated coordinate location of the WCN comprises a first Euclidean distance between the centroid of the first cluster and the estimated coordinate location of the WCN, and the distance between the centroid of the at least another cluster and the estimated coordinate location of the WCN comprises a second Euclidean distance between the centroid of the at least another cluster and the estimated coordinate location of the WCN.

18. The method of claim 17, wherein:
a first cluster zone of the first cluster defines a distance from the centroid of the first cluster according to the product of the distance between the centroid of the first cluster and the estimated coordinate location of the WCN and a predetermined visibility factor.

19. The method of claim 18, wherein:
the predetermined visibility factor comprises a distance scalar representing a limit on sizing of the first cluster.

20. The method of claim 19, further comprising:
if the Euclidean distance between the at least another RP of the plurality of RPs falls within the first cluster zone, the WCN is configured to include the at least another RP of the plurality of RPs within the first cluster.

21. The method of claim 20, wherein:
the centroid of the first cluster including each of the first RP and the at least another RP of the plurality of RPs comprises the quotient of a sum of the coordinates of the first RP and the at least another RP of the plurality of RPs divided by a sum of the total number of the first RP and the at least another RP of the plurality of RPs.

22. The method of claim 21, further comprising:
if the Euclidean distance between the at least another RP and the centroid of the first cluster does not fall within the first cluster zone, generating, at the WCN, the at least another cluster and to include therein the at least another RP of the plurality of RPs.

23. The method of claim 22, further comprising:
separating, at the WCN, the given space into octants based on the received coordinates of the plurality of RPs.

24. The method of claim 23, further comprising:
selectively determining, at the WCN, a predetermined number of clusters, from among octants including any of the first cluster and/or the at least another cluster, as being eligible, according to a determination that any of the first cluster and/or at the at least another cluster is most proximate to the estimated coordinate location of the WCN, to include one or more of the RPs thereof to which the WCN is configured to determine the estimated true ranges thereto, and generating, at the WCN, a listing of said selectively determined clusters.

25. The method of claim 24, wherein:
each estimated true range of the WCN is based on a respectively determined estimated true range to the one or more RPs included in the selectively determined clusters.

26. The method of claim 25, further comprising:
iteratively determining, at the WCN, whether the first cluster or the at least another cluster is most proximate the WCN, based on the respectively determined coordinate location of the WCN as defined by the respectively determined estimated true range to the one or more RPs included in the selectively determined clusters.

* * * * *